(12) United States Patent
Gurgi et al.

(10) Patent No.: US 8,787,057 B2
(45) Date of Patent: Jul. 22, 2014

(54) FAST ANALOG MEMORY CELL READOUT USING MODIFIED BIT-LINE CHARGING CONFIGURATIONS

(71) Applicant: Apple Inc., Cupertino, CA (US)

(72) Inventors: Eyal Gurgi, Petah-TikvaIL (IL); Yael Shur, Tel Aviv (IL); Yoav Kasorla, Even Yehuda (IL)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/709,656

(22) Filed: Dec. 10, 2012

(65) Prior Publication Data

US 2014/0052940 A1  Feb. 20, 2014

Related U.S. Application Data

(60) Provisional application No. 61/683,436, filed on Aug. 15, 2012.

(51) Int. Cl.
*G11C 27/00* (2006.01)

(52) U.S. Cl.
USPC .......................................... 365/45; 365/233.5

(58) Field of Classification Search
CPC ................................ G11C 27/005; G11C 7/22

USPC .................................................. 365/45, 233.5
See application file for complete search history.

(56) References Cited

U.S. PATENT DOCUMENTS

| | | | |
|---|---|---|---|
| 7,969,798 B2 * | 6/2011 | Hwang et al. | 365/189.09 |
| 8,225,181 B2 | 7/2012 | Perlmutter | |
| 8,230,300 B2 | 7/2012 | Perlmutter | |
| 8,248,858 B2 | 8/2012 | Kang | |
| 8,493,783 B2 | 7/2013 | Meir | |
| 8,547,776 B2 * | 10/2013 | Suzuki et al. | 365/230.05 |
| 2013/0063997 A1 | 3/2013 | Maislos | |

* cited by examiner

*Primary Examiner* — Michael Tran

(74) *Attorney, Agent, or Firm* — Meyertons, Hood, Kivlin, Kowert & Goetzel, P.C.

(57) ABSTRACT

A method for data storage includes providing at least first and second readout schemes for reading storage values from a group of analog memory cells that are connected to respective bit lines. The first readout scheme reads the storage values using a first bit line charging configuration having a first sense time, and the second readout scheme reads the storage values using a second bit line charging configuration having a second sense time, shorter than the first sense time. A condition is evaluated with respect to a read operation that is to be performed over a group of the memory cells. One of the first and second readout schemes is selected responsively to the evaluated condition. The storage values are read from the group of the memory cells using the selected readout scheme.

23 Claims, 3 Drawing Sheets

US 8,787,057 B2

FAST ANALOG MEMORY CELL READOUT USING MODIFIED BIT-LINE CHARGING CONFIGURATIONS

CROSS-REFERENCE TO RELATED APPLICATIONS

This application claims the benefit of U.S. Provisional Patent Application 61/683,436, filed Aug. 15, 2012, whose disclosure is incorporated herein by reference.

FIELD OF THE INVENTION

The present invention relates generally to memory devices, and particularly to readout schemes for analog memory cells.

BACKGROUND OF THE INVENTION

Various techniques for reading analog memory cells are known in the art. For example, U.S. Pat. No. 8,059,457, whose disclosure is incorporated herein by reference, describes a method for data storage. The method includes defining at least first and second read commands for reading storage values from analog memory cells. The first read command reads the storage values at a first accuracy, and the second read command reads the storage values at a second accuracy, which is finer than the first accuracy. A condition is evaluated with respect to a read operation that is to be performed over a given group of the memory cells. One of the first and second read commands is selected responsively to the evaluated condition. The storage values are read from the given group of the memory cells using the selected read command.

SUMMARY OF THE INVENTION

An embodiment of the present invention that is described herein provides a method for data storage. The method includes providing at least first and second readout schemes for reading storage values from a group of analog memory cells that are connected to respective bit lines. The first readout scheme reads the storage values using a first bit line charging configuration having a first sense time, and the second readout scheme reads the storage values using a second bit line charging configuration having a second sense time, shorter than the first sense time. A condition is evaluated with respect to a read operation that is to be performed over a group of the memory cells. One of the first and second readout schemes is selected responsively to the evaluated condition. The storage values are read from the group of the memory cells using the selected readout scheme.

In some embodiments, the first readout scheme causes the bit lines to be charged at a first rate, and the second readout scheme causes the bit lines to be charged at a second rate, faster than the first rate. In an embodiment, the first readout scheme specifies first voltages to be applied to the respective bit lines while charging the bit lines, and the second readout scheme specifies second voltages to be applied to the respective bit lines while charging the bit lines, such that at least one of the second voltages is higher than a corresponding one of the first voltages. In another embodiment, reading the storage values includes, after the bit lines are charged using the selected readout scheme, allowing the bit lines to discharge and sensing the discharged bit lines.

In some embodiments, reading the storage values includes sensing respective electrical currents flowing through the bit lines. In an embodiment, the first readout scheme specifies that the electrical currents are to be sensed after a first time delay relative to a beginning of charging the bit lines, and the second readout scheme specifies that the electrical currents are to be sensed after a second time delay, smaller than the first time delay. In another embodiment, the second readout scheme specifies the second time delay such that the bit lines are not fully charged when the electrical currents are sensed.

In a disclosed embodiment, the memory cells in the group belong to a word line selected from among multiple word lines, the first readout scheme applies first pass voltages to the word lines other than the selected word line while reading the group of memory cells, and the second readout scheme applies second pass voltages to the word lines other than the selected word line, such that at least one of the second pass voltages is higher than a corresponding one of the first pass voltages.

In another embodiment, the memory cells in the group belong to a word line, the first readout scheme applies a first voltage to the word line while reading the group of memory cells, and the second readout scheme applies a second voltage to the word line, higher than the first voltage. In yet another embodiment, the analog memory cells are implemented in a memory device, and reading the storage values includes sending to the memory device a command that indicates the selected readout scheme.

There is additionally provided, in accordance with an embodiment of the present invention, apparatus for data storage, including circuitry and a plurality of analog memory cells. The circuitry is configured to evaluate a condition with respect to a read operation that is to be performed over a group of the memory cells that are connected to respective bit lines, to select, responsively to the evaluated condition, between at least first and second readout schemes for reading storage values from the analog memory cells, such that the first readout scheme reads the storage values using a first bit line charging configuration having a first sense time, and such that the second readout scheme reads the storage values using a second bit line charging configuration having a second sense time that is shorter than the first sense time, and to read the storage values from the group of the memory cells using the selected readout scheme.

There is also provided, in accordance with an embodiment of the present invention, apparatus for data storage including an interface and circuitry. The interface is configured for communicating with a memory including a plurality of analog memory cells. The circuitry is configured to evaluate a condition with respect to a read operation that is to be performed over a group of the memory cells that are connected to respective bit lines, to select, responsively to the evaluated condition, between at least first and second readout schemes for reading storage values from the analog memory cells, such that the first readout scheme reads the storage values using a first bit line charging configuration having a first sense time, and such that the second readout scheme reads the storage values using a second bit line charging configuration having a second sense time that is shorter than the first sense time, and to read the storage values from the group of the memory cells using the selected readout scheme.

The present invention will be more fully understood from the following detailed description of the embodiments thereof, taken together with the drawings in which:

DETAILED DESCRIPTION OF EMBODIMENTS

Overview

Figure 1:
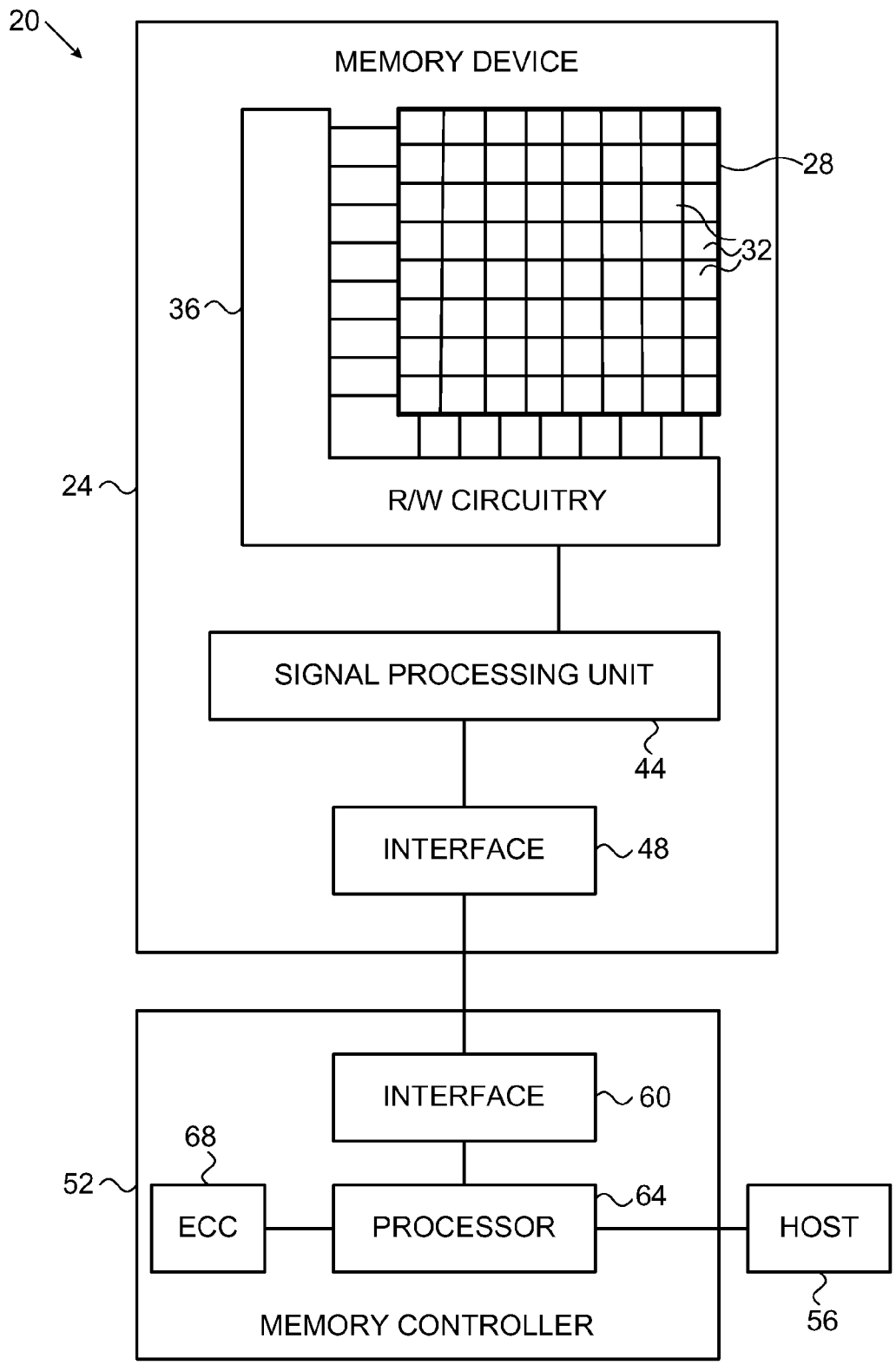
FIG. 1 is a block diagram that schematically illustrates a memory system, in accordance with an embodiment of the present invention.

Data is typically stored in analog memory cells by programming the cells with certain storage values (e.g., threshold voltages) that represent the data. The data is retrieved by reading the storage values from the cells. Usually, a trade-off exists between the accuracy with which the storage values are read and the time needed to read them. Highly-accurate read operations tend to be relatively long and may limit the overall data retrieval speed.

In practice, however, highly-accurate readout is not always mandatory. Some readout tasks can be carried out successfully with reduced accuracy, and therefore with higher speed. Reduced accuracy can be sufficient, for example, when the memory cells are at the beginning of their life cycle, e.g., have gone through only few programming and erasure cycles. As another example, when canceling interference in given memory cells based on the storage values of neighboring cells, the given cells are typically read with high accuracy. The neighboring cells, however, can often be read with lower accuracy with little or no degradation in cancellation performance.

As yet another example, when programming the cells using a Program and Verify (P&V) process, the programmed storage values can be verified with a lower accuracy than the accuracy used for data retrieval. Read operations for estimating the statistical distribution of the storage values (e.g., for adjusting read thresholds) can often be performed with lower accuracy, as well.

Embodiments of the present invention that are described hereinbelow provide improved methods and systems for reading data from analog memory cells. In the disclosed embodiments, a group of analog memory cells is read in response to a read command. The memory cells in the group are connected to respective bit lines that are sensed in order to read the storage values of the memory cells.

Readout may be performed using voltage sensing or using current sensing. When using voltage sensing, the bit lines are charged and then allowed to discharge. After a certain discharging time, the bit line currents or voltages are sensed so as to estimate the cell storage values. When using current sensing, the bit lines are charged, and the bit line currents are sensed after a certain charging time.

The disclosed techniques use multiple readout schemes having different bit-line charging configurations, and correspondingly different sense times. Typically, in preparation for reading the storage values from the group of analog memory cells, a condition related to the read operation is evaluated. An appropriate readout scheme is selected from among the available readout schemes based on the evaluated condition, and the storage values are read using the selected readout scheme. The condition may depend, for example, on the age or wear level of the memory cells to be read, on whether the purpose of the readout operation is to retrieve data, to estimate interference, to verify a previous programming operation or to estimate the storage value statistics.

Several example techniques of implementing readout schemes having different bit-line charging configurations are described herein. In some embodiments, one readout scheme charges the bit lines at a slower rate by applying a lower voltage to the bit lines, whereas another readout scheme charges the bit lines at a faster rate by applying a higher voltage to the bit lines. The first readout scheme is typically slower but more accurate than the second readout scheme, even when both schemes reach a similar final bit line voltage.

In other embodiments, the memory cells are sensed using current sensing. One readout scheme senses the memory cells after a longer charging time, whereas another readout scheme senses the memory cells after a shorter charging time. Again, the first scheme is typically slower but more accurate than the second scheme. In an embodiment, the second readout scheme senses the bit lines before they are fully charged, i.e., before the bit line currents reach saturation or stabilization.

Typically, the memory cells in the group that is to be read with a given readout scheme belong to a certain selected word line in a memory block that includes multiple word lines. In some embodiments, the group of memory cells is read by sensing the bit lines while applying a read voltage to the selected word line and certain pass voltages to the other word lines. In some embodiments, the readout schemes differ from one another in at least one of the pass voltages that are applied to the unselected word lines, and/or in the read voltage applied to the selected word line. By increasing the pass voltages and/or word line voltage, the bit line conductivity can be improved and the sense time shortened.

When using the methods and systems described herein, some readout tasks (e.g., tasks that require high accuracy) are performed with a longer sense time. Other readout tasks, or when conditions permit, are carried out with a shorter sense time. Thus, the disclosed methods provide a considerable increase in average readout speed from analog memory cells, with little or no degradation in other performance measures.

System Description

FIG. 1 is a block diagram that schematically illustrates a memory system 20, in accordance with an embodiment of the present invention. System 20 can be used in various host systems and devices, such as in computing devices, cellular phones or other communication terminals, removable memory modules ("disk-on-key" devices), Solid State Disks (SSD), digital cameras, music and other media players and/or any other system or device in which data is stored and retrieved.

System 20 comprises a memory device 24, which stores data in a memory cell array 28. The memory cell array comprises multiple analog memory cells 32. Memory device and memory controller 52 may support multiple read commands, which read memory cells 32 at different accuracy levels and have different sense times. The use of these multiple read commands is addressed in detail hereinbelow. In some embodiments, the memory device and memory controller communicate with each other using a dedicated command interface in order to implement the multiple read commands or schemes defined herein.

In the context of the present patent application and in the claims, the term "analog memory cell" is used to describe any memory cell that holds a continuous, analog level of a physical quantity, such as an electrical voltage or charge. Array 28 may comprise analog memory cells of any kind, such as, for example, NAND, NOR and CTF Flash cells, PCM, NROM, FRAM, MRAM and DRAM cells. Memory cells 32 may comprise Single-Level Cells (SLC) or Multi-Level Cells (MLC, also referred to as multi-bit cells).

Memory cells 32 of array 28 are typically arranged in a grid having multiple rows and columns, commonly referred to as word lines and bit lines, respectively. Cells are typically erased in groups of word lines that are referred to as erasure blocks. In some embodiments, a given memory device comprises multiple memory cell arrays, which may be fabricated on separate dies. Alternatively, memory cells 32 may be arranged in accordance with any other suitable connectivity scheme, such as various two-dimensional (2D) and three-dimensional (3D) configurations.

The charge levels stored in the cells and/or the analog voltages or currents written into and read out of the cells are referred to herein collectively as analog values or storage values. Although the embodiments described herein mainly address threshold voltages, the methods and systems described herein may be used with any other suitable kind of storage values.

System 20 stores data in the analog memory cells by programming the cells to assume respective memory states, which are also referred to as programming levels. The programming states are selected from a finite set of possible states, and each state corresponds to a certain nominal storage value. For example, a 2 bit/cell MLC can be programmed to assume one of four possible programming states by writing one of four possible nominal storage values to the cell.

Memory device 24 comprises Reading/Writing (R/W) circuitry 36, which converts data for storage in the memory device to storage values and writes them into memory cells 32. In alternative embodiments, the R/W circuitry does not perform the conversion, but is provided with voltage samples, i.e., with the storage values for storage in the cells. When reading data out of array 28, the R/W circuitry converts the storage values of memory cells 32 into digital samples having a resolution of one or more bits. The R/W circuitry typically reads data from cells 32 by comparing the storage values of the cells to one or more read thresholds. Data is typically written to and read from the memory cells in groups that are referred to as pages. In some embodiments, the R/W circuitry can erase a group of cells 32 by applying one or more negative erasure pulses to the cells.

Among other tasks, R/W circuitry 36 applies appropriate voltages to the different bit lines and word lines during read operations, applies appropriate programming pulses to word lines during programming operations, and senses the voltages or currents of the bit lines during read operations.

The R/W circuitry typically reads a group of memory cells 32 along a certain word line simultaneously, in a single sense operation. In a typical read operation, circuitry 36 applies the appropriate bias voltages to the read word line and to the other word lines in the same erasure block. R/W circuitry 36 senses the voltage or current of each bit line. The sensed voltage or current of a given bit line is indicative of the storage value of the memory cell that belongs to this bit line and to the read word line. The R/W circuitry typically compares the sensed bit line voltages or currents to one or more read thresholds, and outputs the comparison results.

In some embodiments, memory device 24 comprises a signal processing unit 44, which applies various signal processing mechanisms to the read and/or programmed data or storage values. In particular, unit 44 may apply signal processing mechanisms that enhance the accuracy of reading the storage values from memory cells 32, such as interference cancellation or read threshold adaptation. The use of these mechanisms is addressed in greater detail below. Signal processing unit 44 communicates with R/W circuitry 36. Additionally, the signal processing circuitry communicates with elements external to device 24 via an interface 48.

The storage and retrieval of data in and out of memory device 24 is performed by a memory controller 52. Controller 52 comprises an interface 60 for communicating with device 24, and a processor 64 that carries out the memory control functions described herein. In some embodiments, memory controller 52 comprises an Error Correction Code (ECC) unit 68, which encodes the data for storage using a suitable ECC, and decodes the ECC of data read from the memory device. In some embodiments, controller 52 produces the storage values for storing in the memory cells and provides these values to device 24. Alternatively, controller 52 may provide the data for storage, and the conversion to storage values is carried out in the memory device.

Memory controller 52 communicates with a host 56, for accepting data for storage in the memory device and for outputting data retrieved from the memory device. In some embodiments, some or even all of the functions of controller 52 may be implemented in hardware. Alternatively, controller 52 may comprise a microprocessor that runs suitable software, or a combination of hardware and software elements.

The configuration of FIG. 1 is an exemplary system configuration, which is shown purely for the sake of conceptual clarity. Any other suitable memory system configuration can also be used. For example, in some embodiments signal processing unit 44 may be omitted, and its functions performed by the memory controller. Elements that are not necessary for understanding the principles of the present invention, such as various interfaces, addressing circuits, timing and sequencing circuits and debugging circuits, have been omitted from the figure for clarity.

In the exemplary system configuration shown in FIG. 1, memory device 24 and memory controller 52 are implemented as two separate Integrated Circuits (ICs). In alternative embodiments, however, the memory device and the memory controller may be integrated on separate semiconductor dies in a single Multi-Chip Package (MCP) or System on Chip (SoC). Further alternatively, some or all of the circuitry of the memory controller may reside on the same die on which the memory array is disposed. Further alternatively, some or all of the functionality of controller 52 can be implemented in software and carried out by a processor or other element of the host system. In some implementations, a single memory controller may be connected to multiple memory devices 24. In yet another embodiment, some or all of the memory controller functionality may be carried out by a separate unit, referred to as a memory extension, which acts as a slave of memory device 24. Typically, processor 64 in controller 52 comprises a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Trade-Off Between Readout Accuracy and Speed

Typically, a trade-off exists between the accuracy at which memory device 24 reads the storage values from memory cells 32, and the speed at which the storage values are read. Highly-accurate readout tends to be relatively slow, whereas fast readout often has a reduced accuracy. In the present context, the term "accuracy" means any measure of the certainty or fidelity at which the storage values read by the circuitry of memory device 24 represent the actual storage values stored in the memory cells. In an accurate read operation, the differences between the read storage values and the respective actual storage values of the memory cells are small, and vice versa. Since any read operation has some inherent uncertainty, different read operations can be characterized by their reading accuracies. Several examples of read commands having different accuracies are described further below. The terms "high accuracy" and "fine accuracy" are used interchangeably herein. In many practical cases, highly-accurate readout is not always needed. Some readout tasks can be carried out successfully at a reduced reading accuracy, and therefore at a higher speed. In some embodiments, memory device 24 and memory controller 52 support multiple predefined types of read commands for reading the storage values from memory cells 32. The different commands read the storage values at different accuracies. Each command has a respective execution time, which is typically longer for higher-accuracy commands and shorter for lower-accuracy commands.

Typically, when memory controller 52 prepares to read the storage values from a certain group of memory cells (e.g., a memory page), the controller evaluates a condition related to the read operation to be performed. Based on the evaluated condition, the memory controller selects one of the predefined read commands, and instructs the memory device to read the storage values in question using the selected command. Several examples of readout tasks that can be performed at different accuracy levels, of conditions that can be evaluated so as to select the appropriate read command, and of read commands having different accuracies and sense times, are described in detail below.

Additional aspects of reading memory cells with multiple accuracies are addressed in U.S. Pat. No. 8,059,457, cited above.

Normal and Fast Readout Using Modified Bit-Line Charging Configurations

In some embodiments, system 20 employs multiple readout schemes having different sense times. When preparing to retrieve data from a certain group of memory cells, the system evaluates a certain condition, and selects the appropriate readout scheme based on this condition. Several examples of such readout schemes are described below.

Although the embodiments described below refer to two readout schemes—a normal configuration and a reduced-sense-time configuration—the disclosed techniques can be used with any other suitable number of readout schemes having different sense times. In some embodiments, memory controller 52 and memory device 24 support one or more readout commands using which the memory controller specifies the readout scheme to be used for retrieving certain data. In alternative embodiments, the memory device evaluates the condition and selects the appropriate readout scheme irrespective of the memory controller.

The embodiments described herein refer to a certain partitioning of tasks between the memory device and the memory controller. This choice, however, is made purely by way of example. In alternative embodiments, the tasks of evaluating the condition, selecting and setting the appropriate readout scheme and reading the memory cells can be divided in any desired way between the memory device and memory controller, or even performed exclusively by only one of them.

Typically, each of the memory cells in the read group belongs to a respective bit line. In various embodiments, R/W circuitry 36 reads the memory cells using a scheme referred to as voltage sensing, or using a scheme referred to as current sensing. When using voltage sensing, circuitry 36 charges the bit lines and then allows them to discharge. After a certain discharging time, circuitry 36 senses the bit line currents or voltages so as to estimate the cell storage values. When using current sensing, circuitry 36 charges the bit lines, and then senses the bit line currents after a certain charging time.

In various embodiments, system 20 defines the normal and reduced-sense-time readout schemes in different ways so as to have different bit-line charging configurations and thus different sense times and accuracies.

Figure 2:
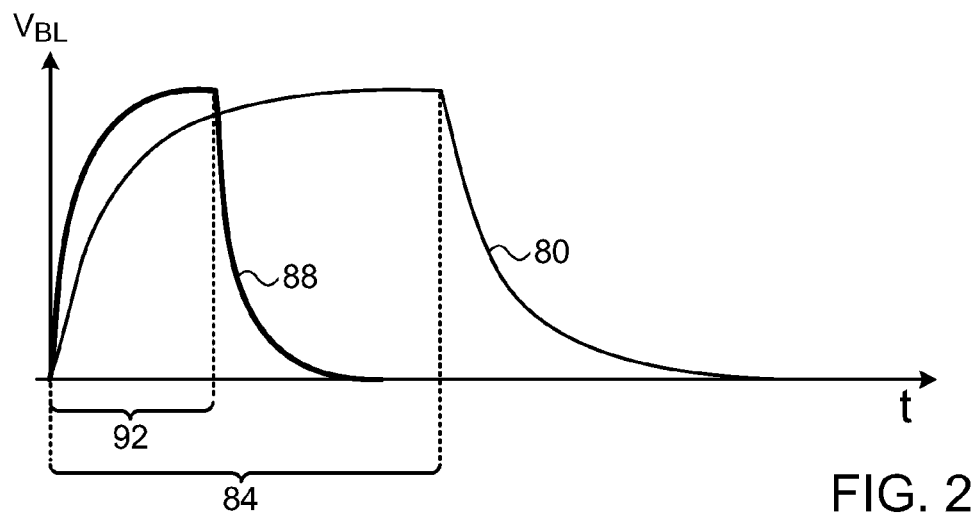
FIGS. 2-4 are graphs showing bit-line charging configurations for normal and fast readout, in accordance with embodiments of the present invention.

FIG. 2 is a graph showing bit-line charging configurations for normal and fast readout, in accordance with an embodiment of the present invention. In this embodiment, R/W circuitry 36 reads the group of memory cells using voltage sensing. The figure shows the bit-line voltage $V_{BL}$ as a function of time, for the normal and reduced-sense-time readout schemes.

A plot 80 illustrates a single charge-discharge cycle performed using the normal readout scheme. In this example, the bit line is charged during a charge period 84, and then allowed to discharge. The bit line voltage or current is sensed after a certain discharging time. As can be seen in the figure, charge period 84 takes on the order of half of the overall readout time.

A plot 88 in FIG. 2 illustrates a single charge-discharge cycle performed using the reduced-sense-time readout scheme. In this example, the bit line is charged during a charge period 92, which is considerably shorter than charge period 84 of the normal readout scheme. In other words, in the reduced-sense-time readout scheme the bit line is charged at a considerably higher rate in comparison with the normal readout scheme.

As a result, the overall readout time of the reduced-sense-time readout scheme is considerably shorter. On the other hand, because of the higher charging rate, the reduced-sense-time readout scheme is less accurate. Nevertheless, as explained above, the accuracy of the reduced-sense-time readout scheme is sufficient in some applications.

Typically, as can be seen in the figure, both readout schemes charge the bit line to a similar final bit line voltage. Typically, however, the reduced-sense-time readout scheme has a larger statistical variation in the final bit line voltage over the multiple bit lines.

In some embodiments, R/W circuitry 36 may implement the different charging rates by applying a certain bit line voltage when charging the bit lines using the normal readout scheme, and a higher bit line voltage when charging the bit lines using the reduced-sense-time readout scheme.

Figure 3:
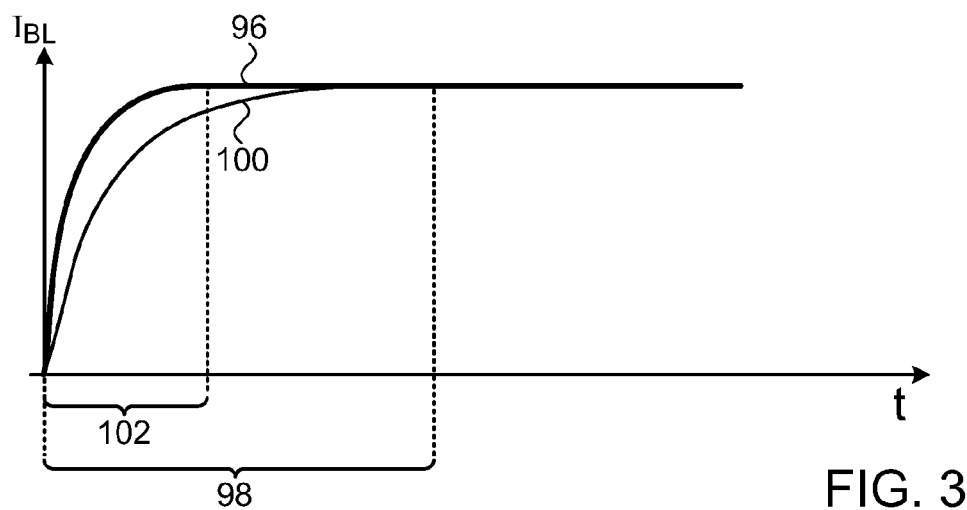

FIG. 3 is a graph showing bit-line charging configurations for normal and fast readout, in accordance with another embodiment of the present invention. In this embodiment, R/W circuitry 36 reads the group of memory cells using current sensing. The figure shows the bit-line current $I_{BL}$ as a function of time, for the normal and reduced-sense-time readout schemes.

A plot 100 illustrates a single charge cycle performed using the normal readout scheme. In this example, the bit line is charged during a charge period 98 before the bit line is fully charged and the bit line current stabilizes. A plot 96 illustrates a single charge cycle performed using the reduced-sense-time readout scheme. In this example, the bit line is charged during a charge period 102, which is considerably shorter than charge period 98 of the normal readout scheme.

In the example of FIG. 3, R/W circuitry 36 charges the bit line at different rates by applying a certain bit line voltage when charging the bit lines using the normal readout scheme, and a higher bit line voltage when charging the bit lines using the reduced-sense-time readout scheme.

The time at which the bit line is sensed can be set to any suitable point on these plots. Typically, when using the reduced-sense-time readout scheme, R/W circuitry 36 senses the bit line after a smaller charge period in comparison with the normal readout scheme.

In some embodiments, R/W unit 36 senses the bit line shortly after the bit line current saturates or stabilizes, e.g., following period 98 in the normal readout scheme and following period 102 in the reduced-sense-time readout scheme. In an alternative embodiment, the reduced-sense-time readout scheme senses the bit line current before it is fully charged, i.e., before the bit line current reaches saturation or stabilization. This technique further shortens the sense time at the expense of degraded accuracy.

Figure 4:
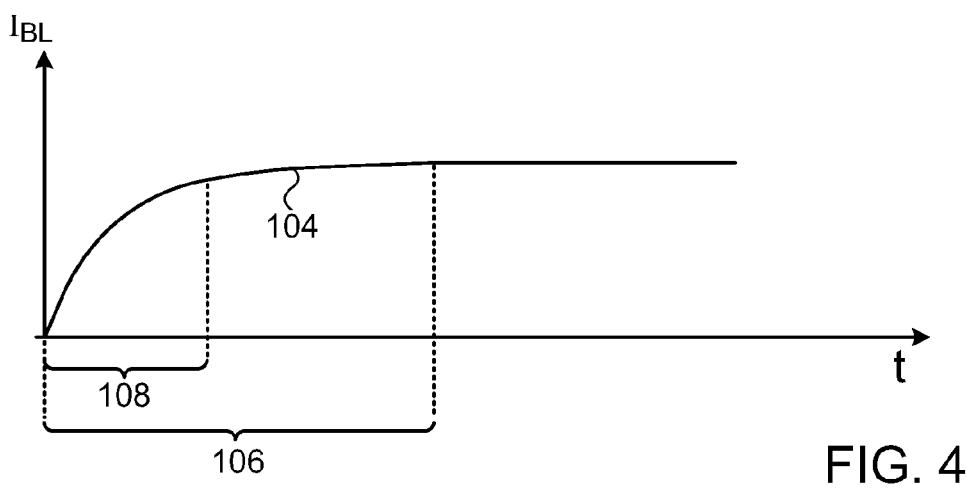

FIG. 4 is a graph showing bit-line charging configurations for normal and fast readout, in accordance with yet another embodiment of the present invention. This example also refers to current sensing. In this embodiment, however, R/W circuitry 36 uses the same bit line voltage for charging the bit line in the normal and reduced-sense-time readout schemes. A plot 104 illustrates the bit lone charging cycle.

In the present embodiment, although the bit line voltage is the same, the R/W circuitry senses the bit line current after a charge period 106 in the normal readout configuration, and after a much shorter charge period 108 in the reduced-sense-time readout configuration. As a result, the reduced-sense-time readout scheme is faster but less accurate.

In this embodiment too, the reduced-sense-time readout scheme may sense the bit line current before it is fully charged, i.e., before the bit line current reaches saturation or stabilization.

The bit-line charging configurations shown in FIGS. 2-4 are examples configurations that are chosen purely for the sake of conceptual clarity. In alternative embodiments, system 20 may define and use any other suitable bit-line charging configurations for normal and fast readout.

Figure 5:
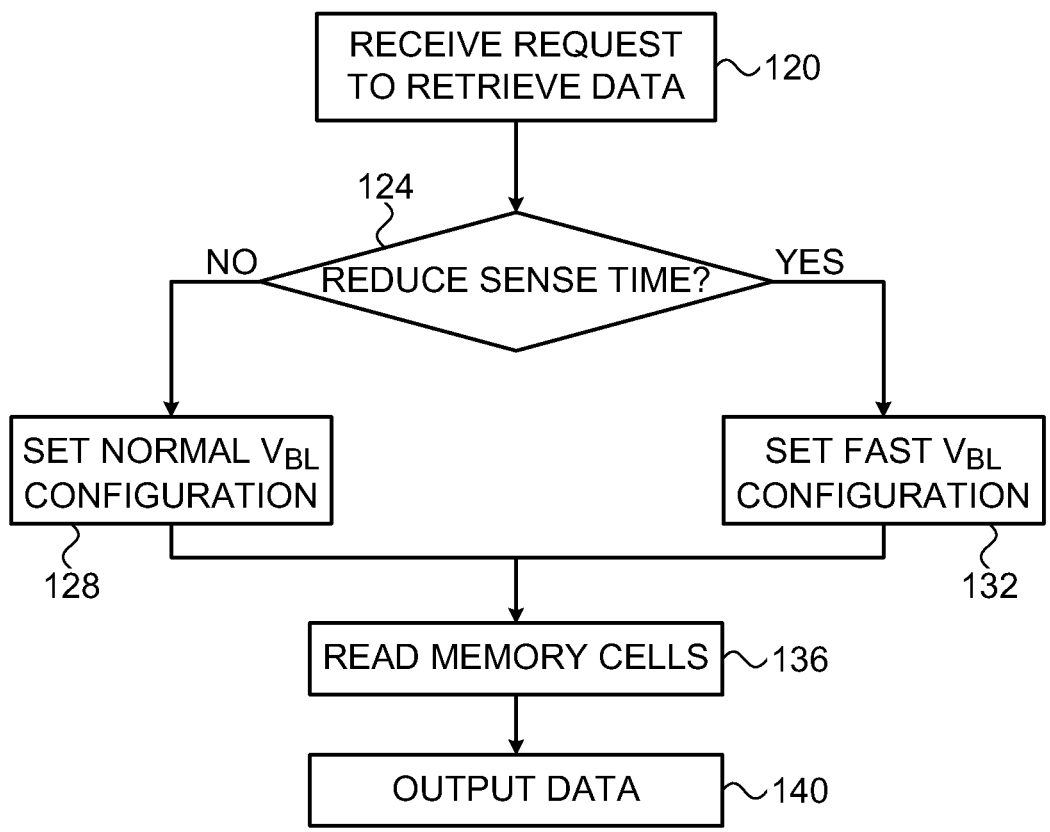
FIG. 5 is a flow chart that schematically illustrates a method for memory cell readout, in accordance with an embodiment of the present invention.

FIG. 5 is a flow chart that schematically illustrates a method for memory cell readout, in accordance with an embodiment of the present invention. The method begins with memory controller 52 accepting a request from host 56 to retrieve certain data, at a request step 120. The data in question is stored in a certain group of memory cells 32, e.g., in a certain page that belongs to a certain word line.

The memory controller holds a definition of two or more readout schemes that differ from one another in sense time, as explained above. The present example refers to two readout schemes—a normal configuration and a reduced-sense-time configuration. The memory controller evaluates a condition that indicates whether the memory cell group in question is to be read using the normal or the reduced-sense-time readout scheme, at a condition evaluation step 124. Any suitable condition can be used for this purpose. For example, the memory controller may use any of the above-described conditions used for selecting read commands.

If the memory cell group is to be read with a normal sense time, the memory controller sets memory device 24 to the normal readout scheme, at a normal setting step 128. If, on the other hand, the memory cell group is to be read using a reduced sense time, the memory controller sets the memory device to reduced-sense-time readout scheme, at a reduced-time setting step 132. (In the example of FIG. 5, the normal and reduced-sense-time readout schemes use different bit line voltages that cause different bit line charge times. Alternatively, however, the normal and reduced-sense-time readout schemes may use the same bit line voltage, such as in the schemes of FIG. 4.)

The memory device then reads the memory cells in the group using the selected readout scheme, at a readout step 136. The memory controller outputs the read data, at an output step 140.

Selection Criteria, and Additional Embodiments and Variations

Memory controller 52 may evaluate various conditions in order to select one of the predefined read commands for performing a given readout task. For example, a group of memory cells that has gone through a large amount of wear (e.g., a large number of programming and erasure cycles and/or long retention periods) may suffer from a high level of distortion, and should therefore be read at high accuracy. A group of memory cells that has gone through a small amount of wear may be read successfully at a lower accuracy and at a higher speed. Thus, in some embodiments, the memory controller selects the read command based on the wear level of the memory cells to be read. Any suitable measure or estimate of the wear level can be used, such as the actual or estimated number of programming and erasure cycles applied to the cells, and/or the time that elapsed since the last programming operation.

This sort of condition may be applied to each individual group of cells, assuming that wear level information is available per cell group. Alternatively, the memory controller may apply the selection jointly for an entire block or even to the entire memory device. For example, the memory controller may use a fast but low-accuracy read command at the beginning of the memory device's lifetime, and switch to a higher-accuracy but slower read command at a later point along the lifetime of the memory device.

As another example, the memory controller may initially select a fast read command by default. If the data cannot be reconstructed successfully using this read command (e.g., if ECC decoding fails), the memory controller may re-attempt to read the storage values using a slower but higher-accuracy command.

In some embodiments, the read command is selected internally in the memory device, such as by signal processing unit 44 or by the R/W circuitry. For example, applying interference cancellation to a certain group of memory cells typically involves reading the storage values from both the interfered memory cells and other memory cells (typically neighboring cells) that potentially cause the interference. In many practical cases, the interference can be canceled successfully even if the storage values of the interfering memory cells are known at a low accuracy. Thus, when applying interference cancellation, the memory device may read the storage values of the potentially-interfering cells using a fast but low-accuracy command.

In some embodiments, memory cells 32 comprise multi-level cells, each storing multiple data bits. In many data storage schemes, different bits in a group of memory cells are used for storing different memory pages. Consider, for example, a group of 3 bit/cell memory cells. Each memory cell stores three bits, which are referred to as a Least Significant Bit (LSB), a Center Significant Bit (CSB) and a Most Significant Bit (MSB). The LSBs of the cells in the group are used for storing a certain page, the CSBs store a different page, and yet another page is stored in the MSBs. In these embodiments, the pages stored in different significance bits often have different error probabilities. Therefore, different significance bits can be read using different read commands. This selection can be performed either by the memory controller or by the memory device, as appropriate.

As yet another example, the R/W circuitry may program the memory cells using an iterative Program and Verify (P&V) process. In a typical P&V process, an entire memory page is written by applying a sequence of programming pulses to the group of memory cells that are mapped to this page. The amplitude of the programming pulses increases incrementally from pulse to pulse. The storage values programmed into the cells are read ("verified") after each pulse, and the iterations continue until the desired levels are reached. Typically, programming verification can be performed successfully even if the storage values are read at a low accuracy. Thus, the R/W circuitry may read the storage values during verification reading tasks using a fast but low-accuracy command.

As another example, in some embodiments the memory device or the memory controller adjusts the read thresholds used in read operations, based on the statistical distribution of the storage values stored in the memory cells. For example, device 24 or controller 52 may perform one or more read operations for estimating the Cumulative Distribution Function (CDF) of the cell storage values, and then adjust the read thresholds based on the estimated CDF. Techniques of this sort are described, for example, in PCT International Publication WO 2008/111058, cited above. Typically, read operations performed in order to estimate the storage value distribution can be performed at low accuracy.

Further alternatively, the appropriate predefined readout scheme for performing a certain readout task can be selected based on any other suitable condition. For example, two or more of the above-mentioned conditions can be combined. Although certain conditions are referred to above as being evaluated by the memory controller, the condition evaluation and/or command selection can be performed by the memory controller or by circuitry internal to the memory device, as desired.

In some embodiments, memory controller 52 initially reads data from memory device 24 using fast and limited-accuracy read commands. The memory controller reverts to higher-accuracy but slower read commands only if data readout fails. Using this logic, the readout accuracy is matched to the actual characteristics of the data and memory cells in question. The memory controller attempts to read the data using fast read commands first, and reverts to slower commands only if higher accuracy is needed.

In some embodiments, memory controller 52 sets the sense time for reading a certain word line depending on the number of other word lines in the same block that are programmed with data. The rationale behind this technique is that erased (non-programmed) memory cells improve the bit line conductivity, whereas programmed memory cells degrade it. When a memory block has only a small number of programmed word lines, the conductivity of the bit lines in the block is typically good, and it is typically possible to read the desired word line with a short sense time. If, on the other hand, the block has many programmed word lines (i.e., few erased cells per bit line), the bit line conductivities may be poorer and a longer sense time may be needed.

In some embodiments, the normal and reduced-sense-time readout schemes differ from one another in the pass voltages ($V_{PASS}$) that are applied during readout to unselected word lines in the memory block, i.e., to the word lines other than the word line being read. In one embodiment, the normal readout scheme sets a certain default set of pass voltages. The reduced-sense-time readout scheme sets another set of pass voltages, at least one of which is higher than the corresponding pass voltage in the normal readout scheme.

Additionally or alternatively, the normal and reduced-sense-time readout schemes differ from one another in the word line voltage that is applied during readout to the word line being read. In one embodiment, the normal readout scheme sets a certain default word line voltage. The reduced-sense-time readout scheme sets a higher word line voltage.

Setting a higher pass voltage or word line voltage helps to improve the bit line conductivity, and therefore enables shorter sense time. On the other hand, increasing the pass voltage or word line voltage may increase the probability of over-programming, read disturb or other impairments. Therefore, this technique is typically used only selectively, e.g., when conditions permit, when other impairments are tolerable or when short sense time is particularly important.

In some embodiments, the memory device and memory controller support a command interface, using which the memory controller instructs the memory device to execute the appropriate read commands. Such commands may instruct the memory controller to apply a certain predefined read command (e.g., a command having a certain sense time), to activate or deactivate a certain signal processing mechanism implemented internally to the memory device, to set attribute values such as read thresholds or interference cancellation parameters, and/or to instruct the memory device to perform any suitable action or configure any suitable attribute in order to execute the read commands described herein.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for data storage, comprising:
providing at least first and second readout schemes for reading storage values from a group of non-volatile memory cells that are connected to respective bit lines, such that the first readout scheme reads the storage values using a first bit line charging configuration having a first sense time and the second readout scheme reads the storage values using a second bit line charging configuration having a second sense time, wherein the second sense time is shorter than the first sense time;
evaluating a condition with respect to a read operation that is to be performed over the group of the memory cells;
selecting one of the first and second readout schemes responsively to the evaluated condition; and
reading the storage values from the group of the memory cells using the selected readout scheme;
wherein the group of the memory cells belong to a word line selected from among multiple word lines, wherein the first readout scheme applies pass voltages with first voltage levels to word lines other than the selected word line while reading the group of the memory cells, wherein the second readout scheme applies pass voltages with second voltage levels to the word lines other than the selected word line, and wherein at least one of the second voltage levels is higher than a corresponding one of the first voltage levels.

2. The method according to claim 1, wherein the first readout scheme causes the bit lines to be charged at a first rate, and wherein the second readout scheme causes the bit lines to be charged at a second rate, wherein the second rate is faster than the first rate.

3. The method according to claim 1, wherein the first readout scheme specifies first voltages to be applied to the respective bit lines while charging the bit lines, and wherein the second readout scheme specifies second voltages to be applied to the respective bit lines while charging the bit lines, such that at least one of the second voltages is higher than a corresponding one of the first voltages.

4. A method for data storage, comprising:
providing at least first and second readout schemes for reading storage values from a group of non-volatile memory cells that are connected to respective bit lines, such that the first readout scheme reads the storage values using a first bit line charging configuration having a first sense time and the second readout scheme reads the storage values using a second bit line charging configuration having a second sense time, wherein the second sense time is shorter than the first sense time;
evaluating a condition with respect to a read operation that is to be performed over the group of the memory cells;
selecting one of the first and second readout schemes responsively to the evaluated condition; and
reading the storage values from the group of the memory cells using the selected readout scheme;
wherein reading the storage values comprises, after the bit lines are charged using the selected readout scheme, allowing the bit lines to discharge and sensing the discharged bit lines.

5. A method for data storage, comprising:
providing at least first and second readout schemes for reading storage values from a group of non-volatile memory cells that are connected to respective bit lines, such that the first readout scheme reads the storage values using a first bit line charging configuration having a first sense time and the second readout scheme reads the storage values using a second bit line charging configuration having a second sense time, wherein the second sense time is shorter than the first sense time;
evaluating a condition with respect to a read operation that is to be performed over the group of the memory cells;
selecting one of the first and second readout schemes responsively to the evaluated condition; and
reading the storage values from the group of the memory cells using the selected readout scheme;
wherein reading the storage values comprises sensing respective electrical currents flowing through the bit lines.

6. The method according to claim 5, wherein the first readout scheme specifies that the electrical currents are to be sensed after a first time delay relative to a beginning of charging the bit lines, and wherein the second readout scheme specifies that the electrical currents are to be sensed after a second time delay, wherein the second time delay is smaller than the first time delay.

7. The method according to claim 6, wherein the second readout scheme specifies the second time delay such that the bit lines are not fully charged when the electrical currents are sensed.

8. A method for data storage, comprising:
providing at least first and second readout schemes for reading storage values from a group of non-volatile memory cells that are connected to respective bit lines, such that the first readout scheme reads the storage values using a first bit line charging configuration having a first sense time and the second readout scheme reads the storage values using a second bit line charging configuration having a second sense time, wherein the second sense time is shorter than the first sense time;
evaluating a condition with respect to a read operation that is to be performed over the group of the memory cells;
selecting one of the first and second readout schemes responsively to the evaluated condition; and
reading the storage values from the group of the memory cells using the selected readout scheme;
wherein the memory cells in the group belong to a word line, wherein the first readout scheme applies a first voltage to the word line while reading the group of memory cells, and wherein the second readout scheme applies a second voltage to the word line, higher than the first voltage.

9. The method according to claim 1, wherein the non-volatile memory cells are implemented in a memory device, and wherein reading the storage values comprises sending to the memory device a command that indicates the selected readout scheme.

10. Apparatus for data storage, comprising:
a plurality of non-volatile memory cells; and
circuitry configured to:
evaluate a condition with respect to a read operation that is to be performed over a group of the memory cells that are connected to respective bit lines;
select, responsively to the evaluated condition, between at least first and second readout schemes for reading storage values from the group of the memory cells, wherein the first readout scheme reads the storage values using a first bit line charging configuration having a first sense time, and wherein the second readout scheme reads the storage values using a second bit line charging configuration having a second sense time, wherein the second sense time is shorter than the first sense time; and
read the storage values from the group of the memory cells using the selected readout scheme;
wherein the group of the memory cells belong to a word line selected from among multiple word lines, wherein the first readout scheme applies pass voltages with first voltage levels to word lines other than the selected word line while reading the group of the memory cells, wherein the second readout scheme applies pass voltages with second voltage levels to the word lines other than the selected word line, and wherein at least one of the second voltage levels is higher than a corresponding one of the first voltage levels.

11. The apparatus according to claim 10, wherein the first readout scheme causes the bit lines to be charged at a first rate, and wherein the second readout scheme causes the bit lines to be charged at a second rate, wherein the second rate is faster than the first rate.

12. The apparatus according to claim 10, wherein the first readout scheme specifies first voltages to be applied to the respective bit lines while charging the bit lines, and wherein the second readout scheme specifies second voltages to be applied to the respective bit lines while charging the bit lines, such that at least one of the second voltages is higher than a corresponding one of the first voltages.

13. Apparatus for data storage, comprising:
a plurality of non-volatile memory cells; and circuitry configured to:
   evaluate a condition with respect to a read operation that is to be performed over a group of the memo cells that are connected to respective bit lines;
   select, responsively to the evaluated condition, between at least first and second readout schemes for reading storage values from the group of the memory cells, wherein the first readout scheme reads the storage values using a first bit line charging configuration having a first sense time, and wherein the second readout scheme reads the storage values using a second bit line charging configuration having a second sense time, wherein the second sense time is shorter than the first sense time; and
   read the storage values from the group of the memory cells using the selected readout scheme;
wherein the circuitry is further configured to read the storage values by allowing the bit lines to discharge after the bit lines are charged using the selected readout scheme, and sensing the discharged bit lines.

14. Apparatus for data storage, comprising:
a plurality of non-volatile memory cells; and
circuitry configured to:
   evaluate a condition with respect to a read operation that is to be performed over a group of the memo cells that are connected to respective bit lines;
   select, responsively to the evaluated condition, between at least first and second readout schemes for reading storage values from the group of the memory cells, wherein the first readout scheme reads the storage values using a first bit line charging configuration having a first sense time, and wherein the second readout scheme reads the storage values using a second bit line charging configuration having a second sense time, wherein the second sense time is shorter than the first sense time; and
   read the storage values from the group of the memory cells using the selected readout scheme;
wherein the circuitry is further configured to read the storage values by sensing respective electrical currents flowing through the bit lines.

15. The apparatus according to claim 14, wherein the first readout scheme specifies that the electrical currents are to be sensed after a first time delay relative to a beginning of charging the bit lines, and wherein the second readout scheme specifies that the electrical currents are to be sensed after a second time delay, wherein the second time delay is smaller than the first time delay.

16. The apparatus according to claim 15, wherein the second readout scheme specifies the second time delay such that the bit lines are not fully charged when the electrical currents are sensed.

17. Apparatus for data storage, comprising:
a plurality of non-volatile memory cells; and
circuitry configured to:
   evaluate a condition with respect to a read operation that is to be performed over a group of the memory cells that are connected to respective bit lines;
   select, responsively to the evaluated condition, between at least first and second readout schemes for reading storage values from the group of the memory cells, wherein the first readout scheme reads the storage values using a first bit line charging configuration having a first sense time, and wherein the second readout scheme reads the storage values using a second bit line charging configuration having a second sense time, wherein the second sense time is shorter than the first sense time; and
   read the storage values from the group of the memory cells using the selected readout scheme;
wherein the memory cells in the group belong to a word line, and wherein the circuitry is further configured to apply a first voltage to the word line while reading the group of memory cells using the first readout scheme, and to apply a second voltage to the word line, higher than the first voltage, when using the second readout scheme.

18. The apparatus according to claim 10, wherein the non-volatile memory cells are implemented in a memory device, and wherein the circuitry is further configured to send to the memory device a command that indicates the selected readout scheme.

19. Apparatus for data storage, comprising:
an interface for communicating with a memory comprising a plurality of analog non-volatile memory cells; and
circuitry configured to:
   evaluate a condition with respect to a read operation that is to be performed over a group of the memory cells that are connected to respective bit lines;
   select, responsively to the evaluated condition, between at least first and second readout schemes for reading storage values from the group of the memory cells, wherein the first readout scheme reads the storage values using a first bit line charging configuration having a first sense time, and wherein the second readout scheme reads the storage values using a second bit line charging configuration having a second sense time, wherein the second sense time is shorter than the first sense time; and
   read the storage values from the group of the memory cells using the selected readout scheme
wherein the group of the memory cells belong to a word line selected from among multiple word lines, wherein the first readout scheme applies pass voltages with first voltage levels to word lines other than the selected word line while reading the group of the memory cells, wherein the second readout scheme applies pass voltages with second voltage levels to the word lines other than the selected word line, and wherein at least one of the second voltage levels is higher than a corresponding one of the first voltage levels.

20. The apparatus according to claim 19, wherein the first readout scheme causes the bit lines to be charged at a first rate, and wherein the second readout scheme causes the bit lines to be charged at a second rate, wherein the second rate is faster than the first rate.

21. The apparatus according to claim 19, wherein the first readout scheme specifies first voltages to be applied to the respective bit lines while charging the bit lines, and wherein the second readout scheme specifies second voltages to be applied to the respective bit lines while charging the bit lines, such that at least one of the second voltages is higher than a corresponding one of the first voltages.

22. The method according to claim 1, wherein the evaluated condition depends upon a number of program and erasure cycles the group of the memory cells have undergone.

23. The method according to claim 1, wherein the evaluated condition depends upon a determination if the group of the memory cells is undergoing a program and verify process.

* * * * *

UNITED STATES PATENT AND TRADEMARK OFFICE
CERTIFICATE OF CORRECTION

PATENT NO.       : 8,787,057 B2                                              Page 1 of 1
APPLICATION NO.  : 13/709656
DATED            : July 22, 2014
INVENTOR(S)      : Eyal Gurgi et al.

It is certified that error appears in the above-identified patent and that said Letters Patent is hereby corrected as shown below:

In the Claims:

Claim 13, Column 15, Line 3, please delete "memo" and substitute -- memory --

Claim 14, Column 15, Line 25, please delete "memo" and substitute -- memory --

Claim 19, Column 16, Line 19, please delete "analog non-volatile" and substitute -- non-volatile --

Signed and Sealed this
Fourteenth Day of October, 2014

Michelle K. Lee
*Deputy Director of the United States Patent and Trademark Office*